United States Patent
Eltawela et al.

(10) Patent No.: US 10,021,716 B2
(45) Date of Patent: Jul. 10, 2018

(54) METHOD FOR SOLVING CONFLICTS IN SCHEDULING CELL BROADCAST MESSAGE RECEPTION AND IDLE MODE TASKS OF A MOBILE DEVICE

(71) Applicant: Intel IP Corporation, Santa Clara, CA (US)

(72) Inventors: Ahmed Eltawela, Cairo (EG); Bernd Kemmer, Eichenau (DE); Michael Zitzmann, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/354,452

(22) Filed: Nov. 17, 2016

(65) Prior Publication Data

US 2017/0181184 A1 Jun. 22, 2017

(30) Foreign Application Priority Data

Dec. 18, 2015 (DE) ........................ 10 2015 122 184

(51) Int. Cl.
| | |
|---|---|
| *H04W 72/00* | (2009.01) |
| *H04W 72/12* | (2009.01) |
| *H04W 76/04* | (2009.01) |
| *H04W 24/10* | (2009.01) |
| *H04W 8/02* | (2009.01) |

(Continued)

(52) U.S. Cl.
CPC ......... *H04W 72/1278* (2013.01); *H04W 8/02* (2013.01); *H04W 24/10* (2013.01); *H04W 68/02* (2013.01); *H04W 76/048* (2013.01); *H04W 76/28* (2018.02)

(58) Field of Classification Search
CPC . H04W 24/10; H04W 68/02; H04W 72/1278; H04W 76/048; H04W 8/02
USPC ............ 455/574, 436, 522, 458, 456.1, 524, 455/435.1, 435.2, 450, 437
See application file for complete search history.

(56) References Cited

U.S. PATENT DOCUMENTS

| | | | |
|---|---|---|---|
| 8,787,262 B2* | 7/2014 | Dhanda | H04W 4/06 370/328 |
| 8,804,546 B2* | 8/2014 | Tenny | H04W 68/00 370/252 |
| 2009/0233634 A1 | 9/2009 | Aghili et al. | |

(Continued)

OTHER PUBLICATIONS

German Patent Office, Office Action issued for DE 10 2015 122 184.5, 6 pages, dated Jul. 21, 2016.

*Primary Examiner* — Joseph Arevalo
(74) *Attorney, Agent, or Firm* — Schiff Hardin LLP (57) ABSTRACT

A method (200) for solving conflicts in scheduling cell broadcast (CB) message reception and idle mode tasks of a mobile device includes: receiving (201) first information indicating a scheduling of a cell broadcast (CB) message (611, 612, 613, 614) reception during a discontinuous reception (DRX) phase of the mobile device; receiving (202) second information indicating a scheduling of an idle mode task (609) during the DRX phase; detecting (203) if a conflict exists in the scheduling of the CB message (611, 612, 613, 614) reception and the scheduling of the idle mode task (609) based on the first and second information (201, 201); and if a conflict (629) is detected (204): rearranging (205) the scheduling of the idle mode task (609) and the scheduling of the CB message (611, 612, 613, 614) reception to solve the conflict.

25 Claims, 7 Drawing Sheets (51) Int. Cl.
*H04W 68/02* (2009.01)
*H04W 76/28* (2018.01)

(56) References Cited

U.S. PATENT DOCUMENTS

| | | | |
|---|---|---|---|
| 2010/0110897 A1* | 5/2010 | Chun | H04L 43/0811 370/241 |
| 2010/0272037 A1 | 10/2010 | Lee et al. | |
| 2011/0130141 A1* | 6/2011 | Frost | H04W 60/02 455/436 |
| 2012/0294169 A1* | 11/2012 | Chui | H04W 52/0274 370/252 |
| 2013/0258919 A1* | 10/2013 | Damnjanovic | H04W 52/0209 370/311 |
| 2013/0279353 A1* | 10/2013 | Ji | H04W 52/0216 370/252 |
| 2014/0161007 A1* | 6/2014 | Donthi | H04W 52/0216 370/311 |
| 2015/0139053 A1* | 5/2015 | Van Lieshout | H04W 52/0216 370/311 |
| 2016/0360537 A1* | 12/2016 | Palenius | H04W 48/08 |

* cited by examiner

METHOD FOR SOLVING CONFLICTS IN SCHEDULING CELL BROADCAST MESSAGE RECEPTION AND IDLE MODE TASKS OF A MOBILE DEVICE

FIELD

The disclosure relates to a method and a device for solving conflicts in scheduling cell broadcast (CB) message reception and idle mode tasks of a mobile device, in particular for use in a single transceiver User Equipment (UE). In particular, the disclosure relates to a cell broadcast service with tight scheduling for single transceiver UEs.

BACKGROUND

Figure 1:
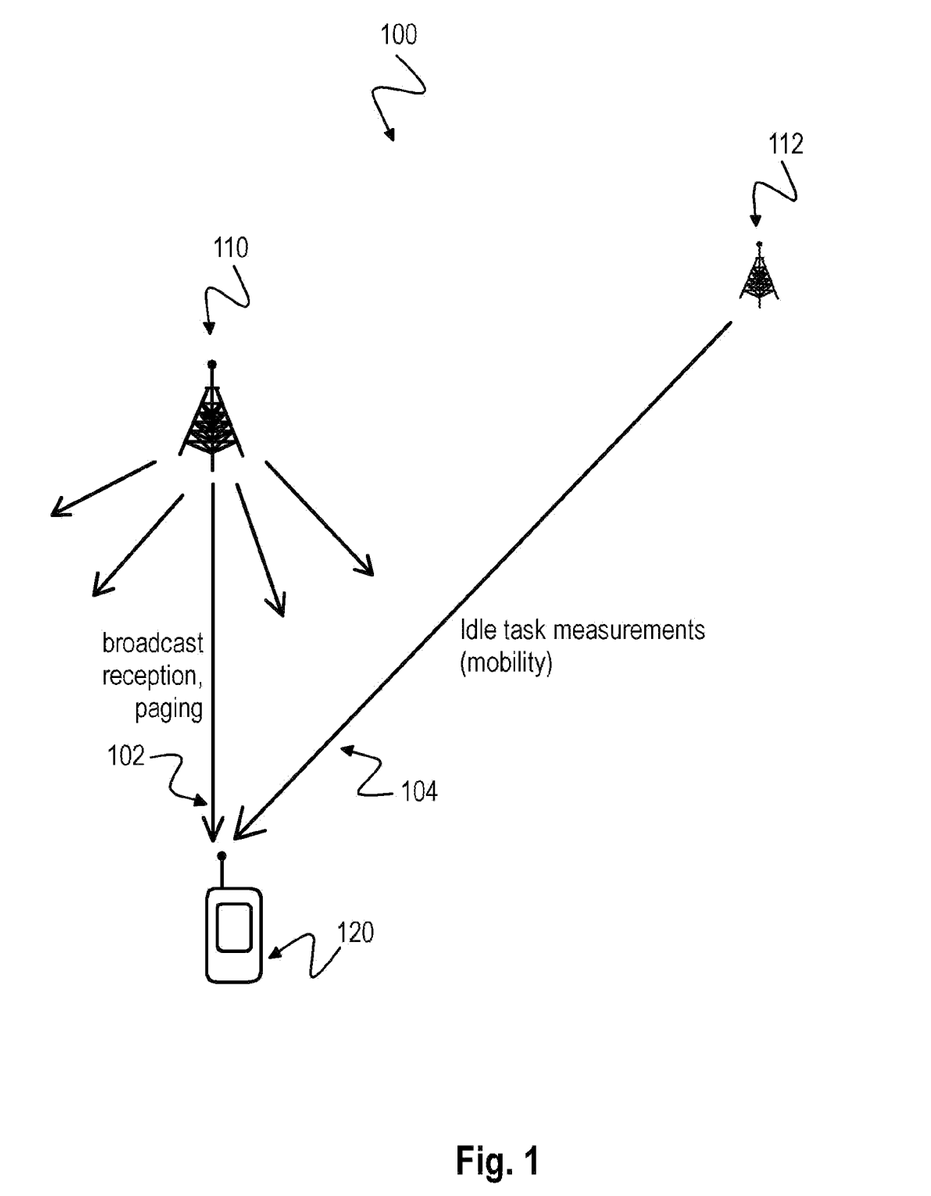
FIG. 1 schematically illustrates a mobile communication system 100 including a mobile device 120 receiving cell broadcast messages 102 from a first radio cell 110 and performing idle task measurements 104 such as mobility measurements with respect to a second radio cell 112 at the same time.

In a radio frequency communications system 100, e.g. as illustrated in FIG. 1 transmission may occur via multiple transmission channels, e.g. when using a transmission system including multiple transmit and/or receive antennas or when receiving signals from multiple radio cells 110, 112.

Mobile phones 120 with single transceiver as depicted in FIG. 1 have only limited capacity to receive cell broadcast (CB) messages 102 and at the same time perform idle task measurements, e.g. measurements at frequencies different from current serving cell's 110 frequency such as inter-frequency and inter-RAT (Radio Access Technology) measurements as defined in mobile communications standards like UMTS. This can result in either loss of mobility when the preference is given to CB reception 102 or loss of cell CB messages when the preference is given to idle task measurements 104.

Current mobile standardization such as 3GPP specification, in particular TS 25.331, TS 23.041, and TR 25.925 actually foresees a relaxed scheduling with up to two discontinuous reception (DRX) levels for CB messages to facilitate that parallel work at UE side and also to enable power saving.

But especially for earthquake warning systems, it was observed that operators are using a very frequent scheduling of CB messages. Some operators use for their application of an Early Earthquake Warning system (EEW) the highest possible transmission rate for CB messages, i.e., they use a cell broadcast service (CBS) allocation period of one, which means that the UE is expected to continuously decode received control messages such as Common Traffic Channel (CTCH) transport blocks to receive CB messages.

Other operators use a similar high transmission rate for CB message with a CBS allocation period of six, which means that the UE is expected to decode received control messages such as CTCH transport blocks used to transmit CB messages each sixth frame.

By using such a tight scheduling current UEs are not able to receive all CB messages and perform idle task measurements at the same time. Therefore, there is a need for an improvement of the UE in order to facilitate idle task measurements and CB reception in the same time interval, in particular for a UE using a single transceiver for these two tasks.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The devices and methods described herein may be used for various wireless communication networks such as Code Division Multiple Access (CDMA), Time Division Multiple Access (TDMA) and Frequency Division Multiple Access (FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95, and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

In radio communications systems, a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include UMTS systems which may conform to the 3GPP standard for UMTS systems. Radio communications signals as disclosed herein may be provided in UMTS systems, in particular over radio communications physical channels, such as primary common pilot channels, secondary common pilot channels, primary common control physical channels (P-CCPCH), secondary common control physical channels (S-CCPCH), dedicated physical channels, dedicated physical control channels or similar channels according to the UMTS standard.

The devices and methods described herein may be applied in Multiple-Input Multiple-Output (MIMO) systems. Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The devices and methods described herein may be applied in discontinuous reception (DRX) phases of a mobile device. Wireless mobile networks such as UMTS employ Discontinuous Reception (DRX) to conserve the power of mobile stations (MSs), also denoted as mobile devices or user equipments (UEs). DRX allows an idle mobile device to power off the radio receiver for a predefined period, denoted hereinafter as the DRX cycle instead of continuously listening to the radio channel. A task of the radio receiver performed in a power off phase is denoted as idle mode task hereinafter.

The UMTS DRX mechanism is realized through the Radio Resource Control (RRC) finite state machine performed between the radio network controller (RNC) and the mobile device. There are two modes in this finite state machine: the RRC Idle mode, in which the MS is tracked by the core network without involving the UTRAN and the RRC Connected mode, which is entered by the mobile device when an RRC connection is established between the mobile device and its serving RNC.

The RRC Connected mode includes four states: CELL DCH state, CELL FACH state, CELL PCH state and URA PCH state. If the UE obtains a dedicated traffic channel for the RRC connection, it enters the CELL DCH state. If the UE is allocated a common or shared traffic channel, it enters the CELL FACH state. In the CELL PCH state, no uplink access is possible, and the UE selects a Paging Channel (PCH) to monitor paging messages from the RNC. In the URA PCH state, the UE performs location update for every UTRAN Registration Area (URA) crossing. In states CELL FACH and CELL PCH, the UE performs location update whenever it moves to a new cell. Idle mode is tied to RRC states idle, URA_PCH, CELL_PCH and partially to CELL_FACH.

In the Cell DCH and Cell FACH states, the mobile receiver is always turned on to receive packets. These states correspond to the power active mode. In the RRC Idle mode, Cell PCH and URA PCH states, the DRX is performed to reduce the UE power consumption. These states correspond to the power saving mode.

The devices and methods described herein may be performed during DRX cycles. A DRX cycle defines the individual time interval between monitoring paging occasion for a specific UE, e.g. as specified in 3GPP TS 25.304 version 5.5.0 Release 5. An exemplary DRX cycle length in FDD mode corresponds to $2^k$ (two to the power of k) frames with k ranging from 3 to 9.

Figure 2:
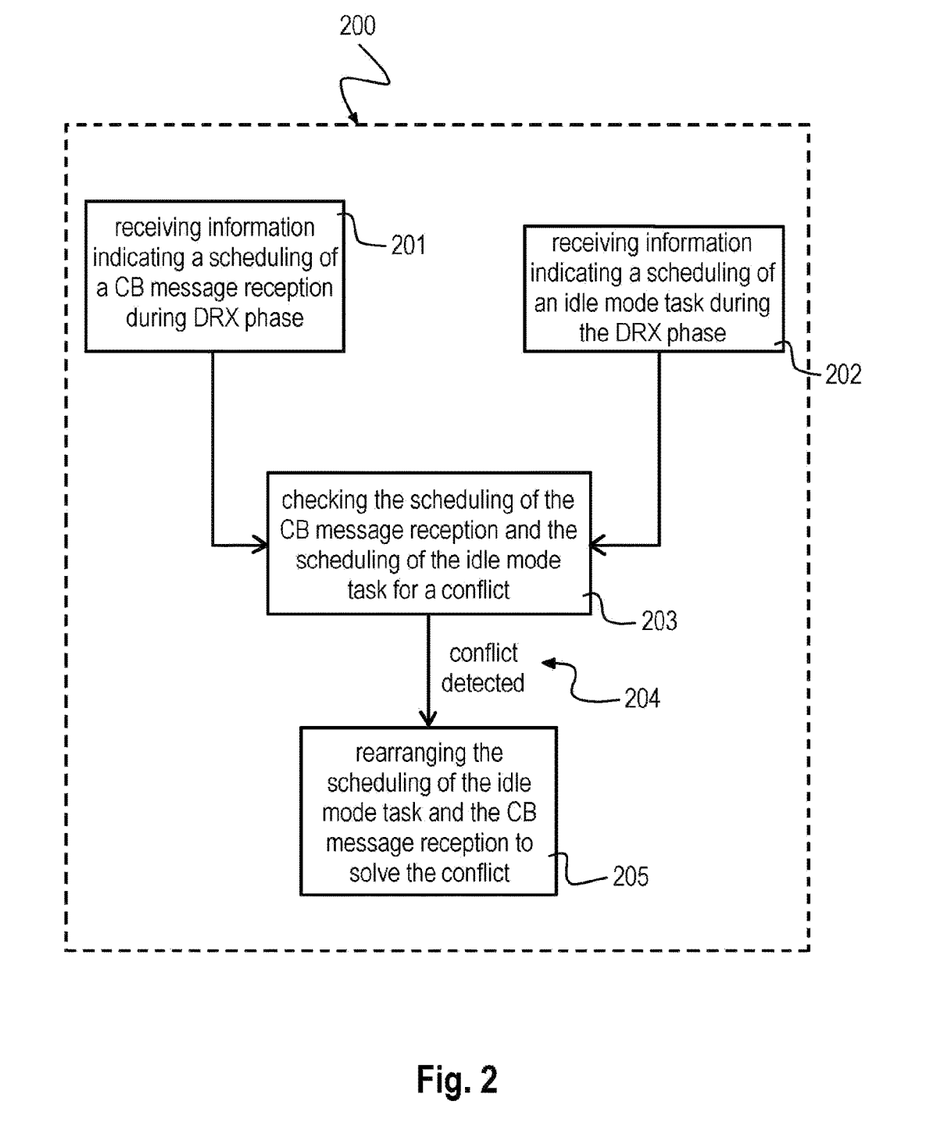
FIG. 2 schematically illustrates a method 200 for solving conflicts in scheduling cell broadcast message reception and idle mode tasks of a mobile device in accordance with the disclosure.

FIG. 2 schematically illustrates a method 200 for solving conflicts in scheduling cell broadcast message reception and idle mode tasks of a mobile device in accordance with the disclosure.

Figure 6:
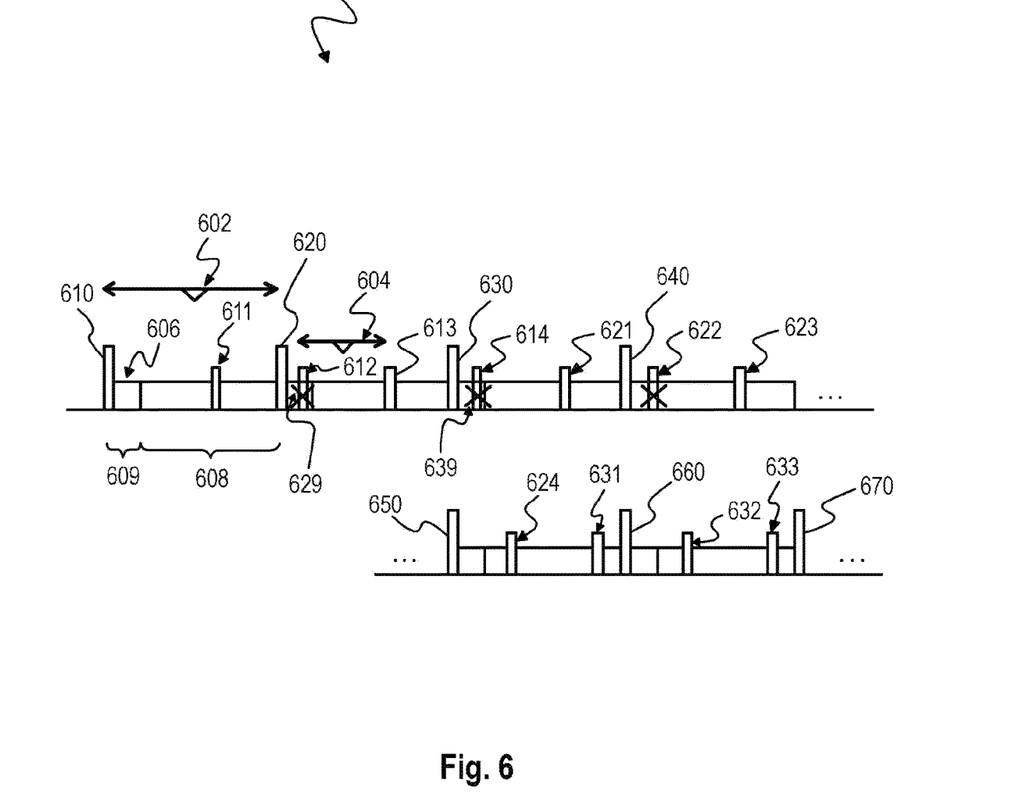
FIG. 6 schematically illustrates a typical scenario 600 for cell broadcast message reception and idle mode tasks in accordance with the disclosure.

The method 200 includes receiving information 201 indicating a scheduling of a cell broadcast (CB) message reception, e.g. cell broadcast messages 611, 612, 613, 614, 621, 622, 623, 624, 631, 632, 633 as depicted in FIG. 6 during a discontinuous reception (DRX) phase of the mobile device. The method 200 includes receiving information 202 indicating a scheduling of an idle mode task, e.g. an idle mode task 609 as illustrated in FIG. 6 during the DRX phase. The idle mode task 609 may include paging and measurement tasks. The method further includes checking 203 the scheduling of the CB message 611, 612, 613, 614, 621, 622, 623, 624, 631, 632, 633 reception and the scheduling of the idle mode task 609 for a conflict. FIG. 6 shows exemplary conflicts 629, 639 between performing the idle mode task, in particular the measurement task and CB message reception 612, 614. The method 200 further includes: if a conflict 629 is detected 204: rearranging 205 the scheduling of the idle mode task 609 and the scheduling of the CB message 611, 612, 613, 614, 621, 622, 623, 624, 631, 632, 633 reception in order to solve the conflict.

The DRX phase may include a plurality of DRX cycles 602 as exemplary depicted in FIG. 6. The checking 203 may be performed on a DRX cycle basis.

The rearranging 205 of the scheduling of the idle mode task 609 may include scheduling all activities related to the idle mode task 609 for being performed within one part of the DRX cycle 602, e.g. the first part 606 as depicted in FIG. 6 of the DRX cycle 602. Of course, any other part of the DRX cycle 602 may be used, for example the last part or a middle part of the DRX cycle 602 (not depicted in FIG. 6). When the first part 606 is used as depicted in FIG. 6, the measurement tasks are succeeding the paging task and after the whole idle mode task 609 is finished, the remaining part of the DRX cycle 602 is available for CB message reception.

The rearranging 205 of the scheduling of the CB message 611, 612, 613, 614, 621, 622, 623, 624, 631, 632, 633 reception may include opening a CB message reception window, e.g. a window 608 as depicted in FIG. 6 for a continuous reception of the CB message. In FIG. 6, the window 608 is open to receive the first CB message 611.

The method 200 may include placing the CB message reception window 608 within the remaining part of the DRX cycle 602, see FIG. 6. The CB message reception window 608 may fill the remaining part of the DRX cycle 602 as illustrated in FIG. 6. Alternatively, the CB message reception window 608 may fill only some section or sections of the remaining part of the DRX cycle 602, e.g. only a section that is large enough to receive at least one of the CB messages 611, 612, 613, 614, 621, 622, 623, 624, 631, 632, 633. The remaining section(s) can be used for other tasks or for powering off the receiver.

Each cell broadcast (CB) message 611, 612, 613, 614 may include a plurality of instances carrying the same information content, i.e. redundant information of the message. In FIG. 6, for example, a first CB message includes the instances 611, 612, 613, 614; a second CB message includes the instances 621, 622, 623, 624; and a third CB message includes the instances 631, 632, 633.

The plurality of instances of the CB message 611, 612, 613, 614 may be arranged in a predetermined configuration, for example a known number of repetitions and a known CB cycle period or CB repetition cycle 604 as exemplary depicted in FIG. 6. The CB repetition cycle 604 indicates a cycle between two succeeding instances, for example 612, 613 as depicted in FIG. 6. The CB repetition cycle 604 may be predetermined.

In particular, the CB repetition cycle 604 may be independent of the DRX cycle 602. For example, there is no synchronization between CB repetition cycle 604 and DRX cycle 602. A beginning of a CB repetition cycle 604 may be independent of a beginning of a DRX cycle 602.

A conflict 629 may be detected if a time interval in which no idle mode task 609 is scheduled is less than a predetermined time interval. The predetermined time interval may correspond to the CB repetition cycle 604.

The idle mode task 609 may include a paging indictor 610 reception and a mobility measurement task as depicted in FIG. 6. Of course, other tasks may also be included in the idle mode task 609.

The mobility measurement task may include inter-frequency measurements and/or inter Radio Access Technology (RAT) measurements.

The information indicating the scheduling of the CB message 611, 612, 613, 614 reception and/or the information indicating the scheduling of the idle mode task 609 may be received by paging information 610 that may be included in a broadcast control channel (BCCH).

Hence, the method 200 as described above may share the same DRX cycle between idle tasks, and CBS reception and decoding, by estimating and reserving the maximum amount of time needed to perform inter-frequency and inter-RAT measurements in each DRX cycle for that task. The remaining time after all idle mode tasks (inclusively these measurements) have been finished may be fully used to continuously receive and decode CTCH for CB purposes.

Because such a configuration results in a higher current consumption in exemplary use cases this above-described method 200 may be applied only in specific network configurations such as for example earthquake warning systems in which operators are using a very frequent scheduling of CB messages to ensure a fast flow of information in emergency cases.

Hence, the method 200 ensures that CB messages especially with tight CBS allocation periods, e.g. earth quake or emergency scenarios can be received reliably while on the other hand side mobility can still be supported at the same time. The method 200 can be reliably implemented on a mobile device using a single transceiver only. CB messages can be reliably received without losing mobility.

Figure 3:
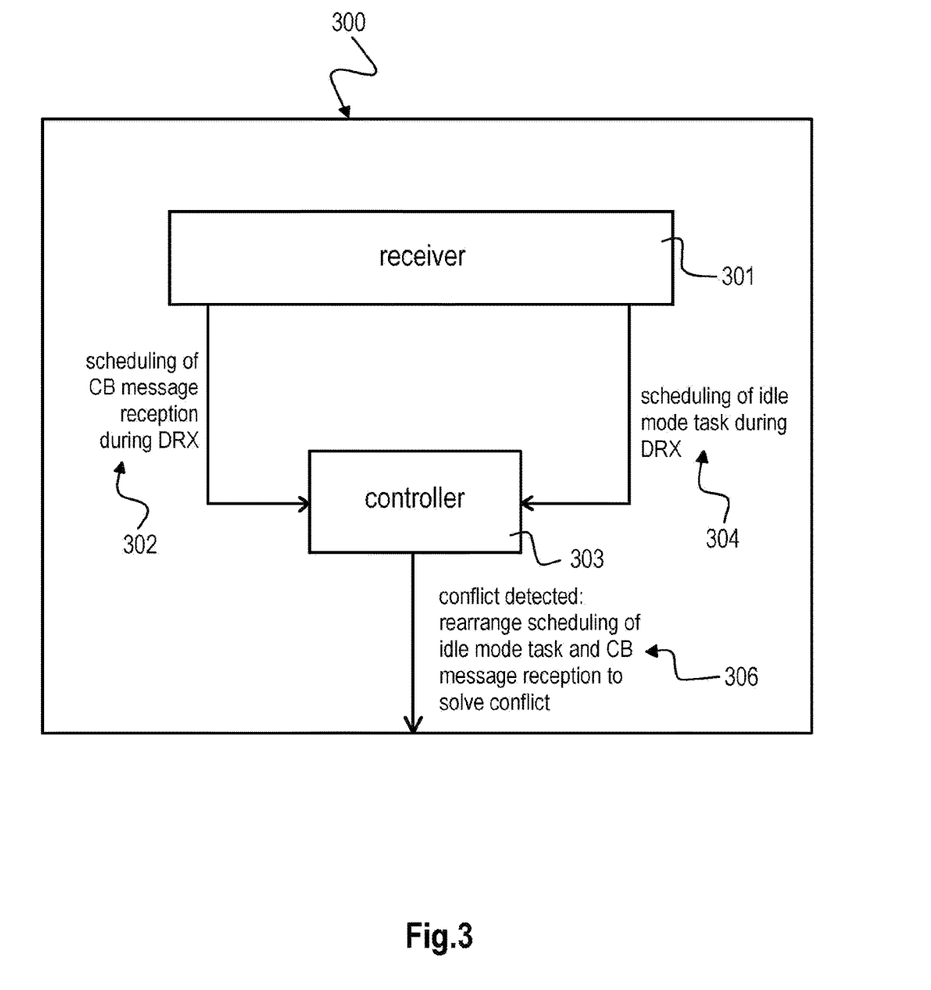
FIG. 3 schematically illustrates a device 300 for solving conflicts in scheduling cell broadcast message reception and idle mode tasks of a mobile device in accordance with the disclosure.

FIG. 3 schematically illustrates a device 300 for solving conflicts in scheduling cell broadcast message reception and idle mode tasks of a mobile device in accordance with the disclosure.

The device 300 includes a receiver 301 and a controller 303. The receiver 301 receives information indicating a scheduling of a cell broadcast (CB) message reception, e.g. cell broadcast messages 611, 612, 613, 614, 621, 622, 623, 624, 631, 632, 633 as depicted in FIG. 6 during a discontinuous reception (DRX) phase of the mobile device. The receiver 301 further receives information indicating a scheduling of an idle mode task, e.g. an idle mode task 609 as illustrated in FIG. 6 during the DRX phase.

The controller 303 checks the scheduling of the CB message 611, 612, 613, 614, 621, 622, 623, 624, 631, 632, 633 reception and the scheduling of the idle mode task 609 for a conflict. FIG. 6 shows exemplary conflicts 629, 639 between performing the idle mode task, in particular the measurement task and CB message reception 612, 614. If a conflict 629 is detected: the controller 303 rearranges the scheduling of the idle mode task 609 and the scheduling of the CB message 611, 612, 613, 614, 621, 622, 623, 624, 631, 632, 633 reception in order to solve the conflict 629.

The DRX phase may include a plurality of DRX cycles 602. The controller 303 may perform the checking on a DRX cycle basis.

The controller 303 may schedule all activities related to the idle mode task 609 for being performed within one part 606 of the DRX cycle 602 if a conflict 629 is detected, e.g. as described above with respect to FIG. 2.

The controller 303 may open a CB message reception window 608 for a continuous reception of the CB message 611, 612, 613, 614, 621, 622, 623, 624, 631, 632, 633 if a conflict 629 is detected. The controller 303 may place the CB message reception window 608 within the remaining part of the DRX cycle 602, e.g. as described above with respect to FIG. 2.

Figure 4:
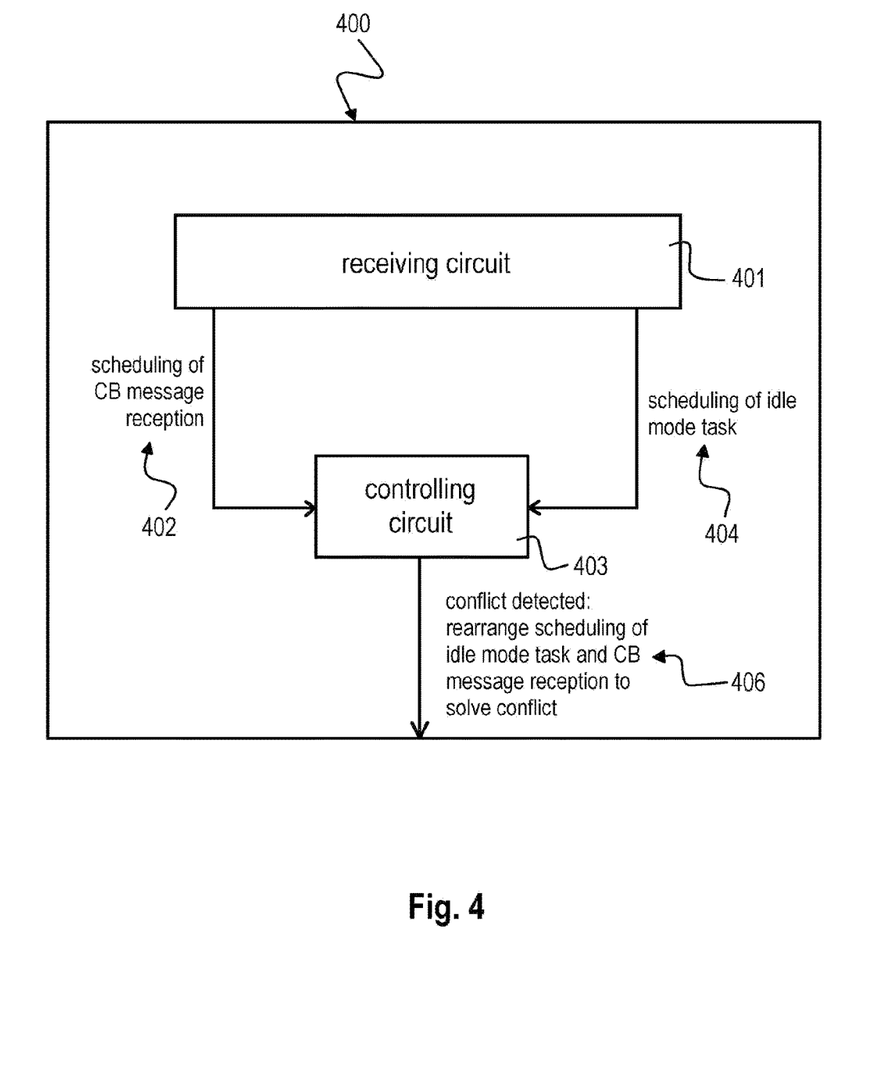
FIG. 4 schematically illustrates an integrated circuit 400 for solving conflicts in scheduling cell broadcast message reception and idle mode tasks of a mobile device in accordance with the disclosure.

FIG. 4 schematically illustrates an integrated circuit 400 for solving conflicts in scheduling cell broadcast message reception and idle mode tasks of a mobile device in accordance with the disclosure.

The integrated circuit 400 includes a receiving circuit 401 and a controlling circuit 403. The receiving circuit 401 is configured to receive information indicating a scheduling of a cell broadcast (CB) message reception, e.g. cell broadcast messages 611, 612, 613, 614, 621, 622, 623, 624, 631, 632, 633 as depicted in FIG. 6 during a discontinuous reception (DRX) phase of the mobile device, and information indicating a scheduling of an idle mode task, e.g. an idle mode task 609 as illustrated in FIG. 6 during the DRX phase.

The controlling circuit 403 is configured to check the scheduling of the CB message 611, 612, 613, 614, 621, 622, 623, 624, 631, 632, 633 reception and the scheduling of the idle mode task 609 for a conflict 629 and if a conflict 629 is detected to rearrange the scheduling of the idle mode task 609 and the scheduling of the CB message 611, 612, 613, 614, 621, 622, 623, 624, 631, 632, 633 reception in order to solve the conflict 629, e.g. as described above with respect to FIGS. 2 and 3.

The controlling circuit 403 may be configured to detect a conflict 629 if a time interval in which no idle mode task 609 is scheduled is less than a predetermined time interval. The idle mode task 609 may include a paging indictor 610 reception and a mobility measurement task.

Figure 5:
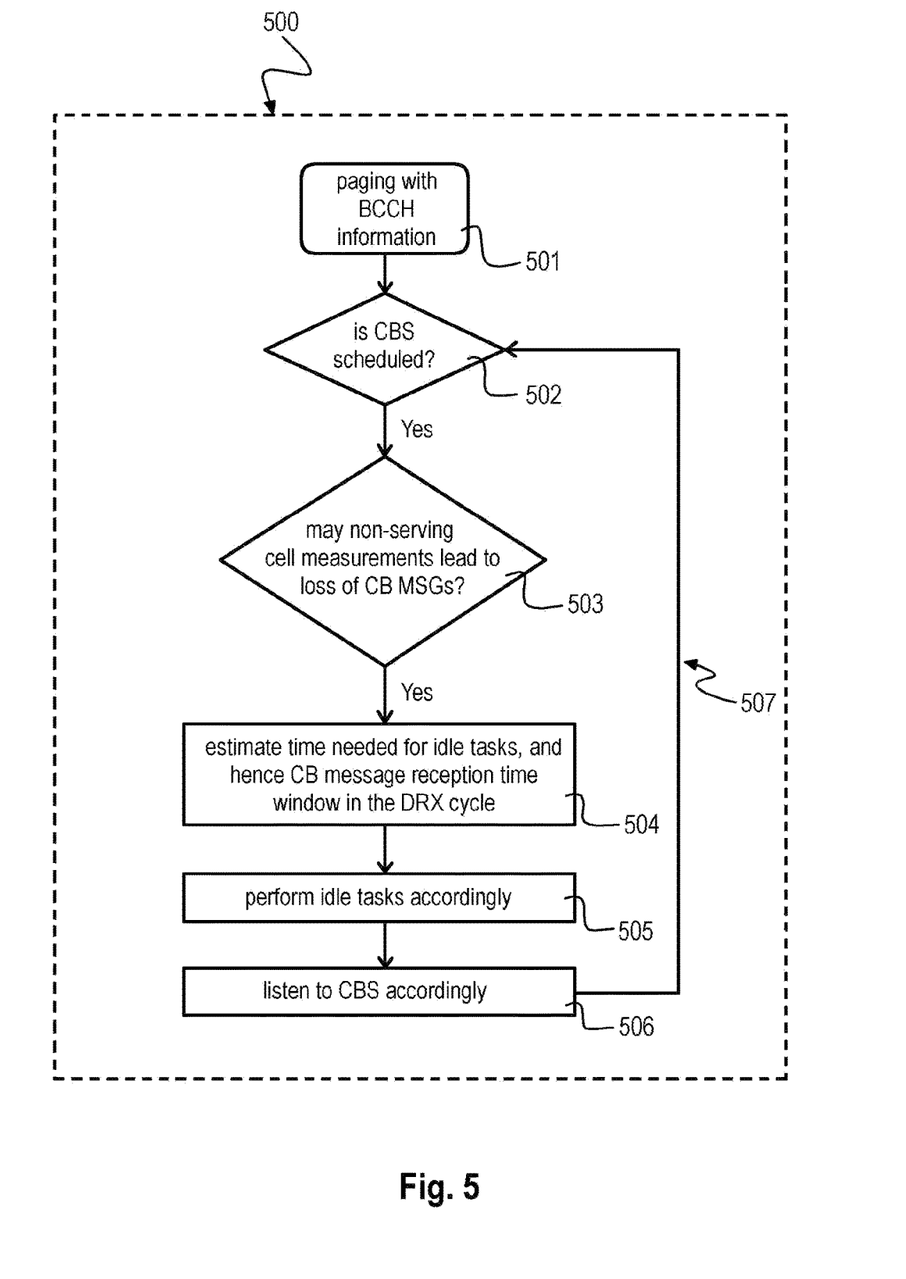
FIG. 5 schematically illustrates a method 500 for solving conflicts in scheduling cell broadcast message reception and idle mode tasks of a mobile device in accordance with the disclosure.

FIG. 5 schematically illustrates a method 500 for solving conflicts in scheduling cell broadcast message reception and idle mode tasks of a mobile device in accordance with the disclosure.

The method 500 starts with a first block 501 performing paging with BCCH information. In a second block 502 it is checked if CBS (cell broadcast service) is scheduled. If CBS is scheduled (Yes) then in a third block 503 it is checked if non-serving cell measurements may lead to loss of CB messages. If this is true (Yes), in a fourth block 504 the time is estimated that is needed for idle tasks, and hence CB message reception time window in the DRX cycle, e.g. according to the description above with respect to FIGS. 2 to 4. A fifth block 505 performing idle tasks accordingly and a sixth block 506 listening to CBS accordingly are following. The performing the idle tasks and the listening to CBS may be implemented as described above with respect to FIGS. 2 to 4. With the beginning of the next DRX cycle, a next iteration 507 of the second block 502 is performed, where the check if CBS is scheduled is performed for the next DRX cycle.

The functionality of the method 500 can be described as follows: For tight CBS allocation periods, in particular to fulfil requirements of some operators regarding earth quake warning and emergency scenarios the UE may be forced to listen to CTCH at each frame, e.g. due to a tight CBS allocation period of 1, for example. However, these operators could not provide CB messages in each frame.

In practice, operator's network may send different CB messages consecutively in case of emergency, see first CB messages 611, 612, 613, 614, second CB messages 621, 622, 623, 624 and third CB messages 631, 632, 633 in FIG. 6. For redundancy, each of these messages may be repeated three times according to the implementation depicted in FIG. 6 with a time interval 604 of 1.3 second in one exemplary implementation as shown in FIG. 6. Of course, other values for the number of repetitions and the time interval 604 are possible. After the last repetition 614, the next message 621 is sent after the exemplary time interval 604 of 1.3 seconds again with the same timing. When all messages are sent the CB scheduling is de-configured in the downlink. I.e. after a couple of ten seconds, for example, the procedure ends.

Due to the size of each single message instance, each instance is distributed over consecutive frames, whilst the remaining frames, even so scheduled for CTCH transport blocks, are not filled with valid data. Note that in FIG. 6, those three frames, for example, are represented by one single box. That means, in on exemplary implementation each message instance 611, 612, 613, 614, 621, 622, 623, 624, 631, 632, 633 may include three frames. Of course other numbers of frames per message instance are also possible. Due to this timing and because there is no fixed relationship to the beginning of a DRX cycle, the UE could not estimate in advance at which frame inside one DRX cycle it can expect a CTCH transport block with valid data.

The method 500 enables the UE to do a trade-off among continuously receiving during one DRX cycle period as many CTCH transport blocks as possible from which it is not known which of them are carrying the real CB message content, whilst still providing enough time to perform inter-frequency and inter-RAT measurement tasks. Using this method 500 ensures that at least one complete CB message per DRX cycle is received.

This capability is obtained by accepting a loss of certain redundancy information and higher power consumption as long as such a specific network configuration is active. A loss of redundancy is therefore not seen as a critical issue because there are still several instances per message that are expected to be received, see FIG. 6.

Higher power consumption may also be limited to the time at which the network may run this procedure, for example in the range of a couple of ten seconds only. In the worst case, if the terminating paging (i.e. no CB message is scheduled) would be missed by the UE, the configuration would be withdrawn either by timer expiration, or at the latest with the next cell selection or reselection.

In details, once the UE gets informed about the scheduling of CB messages, e.g. via paging with BCCH modification information, It will check if currently there is a need to perform inter-frequency or inter-RAT measurements and whether these measurements may lead to a loss of CB messages due to too tight CB scheduling (e.g. CB allocation period <10). If these conditions match, it may perform all idle mode related tasks in one part of the DRX cycle and then open the 'CB message reception window' for continuous CB reception during the remainder of that DRX cycle. This handling may be continued until the UE is informed about the end of this tight CB scheduling. The length of such a 'CB message reception window' may be predetermined or calculated dynamically depending on the time needed for mandatory idle mode tasks, e.g. paging indicator reception and measurements, and the length of one DRX cycle period.

FIG. 6 schematically illustrates a typical scenario 600 for cell broadcast message reception and idle mode tasks in accordance with the disclosure. Three different CB messages are depicted in FIG. 6, each one including a first instance followed by further repetitive instances of the respective message. For example, in FIG. 6 a first message includes the four instances 611, 612, 613 and 614; a second message includes the four instances 621, 622, 623 and 624; and a third message includes the three instances 631, 632, 633. A fourth instance of the third message may follow but is not depicted in FIG. 6. A CB message repetition rate 604 may be for example 1.3 seconds. The CB message instances 611, 612, 613, 614, 621, 622, 623, 624, 631, 632, 633 may be received without synchronization with the DRX cycles 602. An exemplary number of six DRX cycles are illustrated in FIG. 6. Each DRX cycle 602 may start with a paging 610, 620, 630, 640, 650, 660, 670. After the paging 610, 620, 630, 640, 650, 660, 670, mobility measurements may be performed within the first part 606 of the DRX cycle 602.

In the second, third and fourth DRX cycles FIG. 6 illustrates a scenario where a conflict 629, 639 between receiving CB message instances 612, 614 and performing idle task measurements occurs, because CB message instances 612, 614 are received in the same part 606 of the DRX cycle 602 which is used for performing idle task measurements. When performing idle task measurements in this part 606 of the DRX cycle 602 and opening the CB message reception window 608 after this part 606, CB messages 613 and 621 can be received.

In one exemplary implementation operators are working with a DRX cycle period time of 2.56 seconds. Considering approximately 500 ms for mandatory Idle mode tasks (including most time consuming inter-RAT measurements), approximately two seconds would be left for CB message reception during each DRX cycle period (period 608 in FIG. 6). With a repetition rate of 1.3 seconds which is used by some operators, it may be guaranteed that at least one instance per CB message can be received per DRX cycle period 602. And due to the used repetitions it may be expected that even more instances per one message would be received during the next DRX cycle. The method was implemented and verified by different test scenarios. The UE was able to successfully receive 100% of the broadcasted CBS messages at man-machine interface (MMI) level and was capable to perform cell reselection at the same time.

Figure 7:
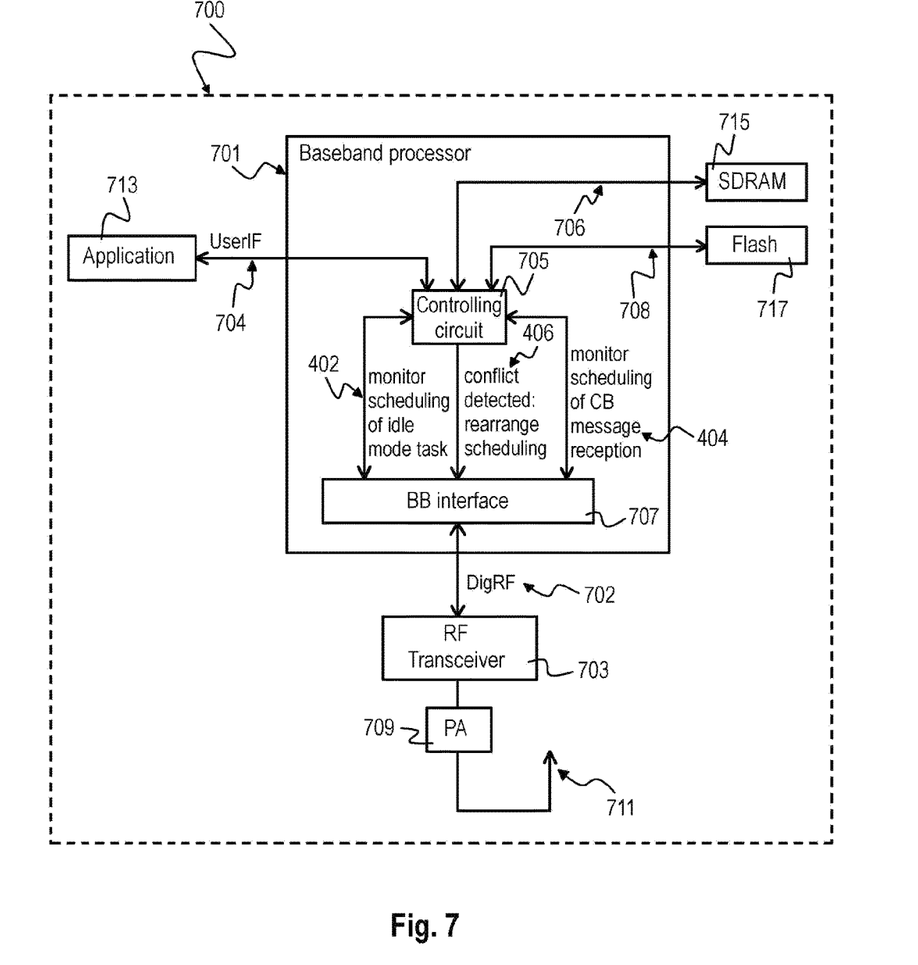
FIG. 7 schematically illustrates a mobile device 700 including a baseband processor chip 701 and a RF transceiver chip 703 and further components.

FIG. 7 schematically illustrates a mobile device 700 including a baseband processor chip 701 and a RF transceiver chip 703 and further components. The baseband processor chip 701 communicates with the RF transceiver chip 703 via a digital RF interface 702. The mobile device 700 further includes a power amplifier 709 and an antenna 711 which are coupled to the transceiver chip 703 for receiving and/or transmitting RF data. The mobile device 700 may further include a SDRAM 715 coupled to the baseband processor chip 701 and a Flash memory 717 coupled to the baseband processor chip 701. The mobile device 700 further includes an application of a user, e.g. a touch-screen or a keyboard or a microphone or load-speaker etc. that are coupled via a user interface 704 to the baseband processor 701. The baseband processor 701 represents a system-on-chip (SoC) including a controlling circuit 705 for controlling communication tasks and a baseband interface 707 for receiving/transmitting data from/to the RF transceiver 703.

The baseband interface 707 is configured to receive information indicating a scheduling of a cell broadcast (CB) message reception, e.g. cell broadcast messages 611, 612, 613, 614, 621, 622, 623, 624, 631, 632, 633 as depicted in FIG. 6 during a discontinuous reception (DRX) phase of the mobile device 700, and information indicating a scheduling of an idle mode task, e.g. an idle mode task 609 as illustrated in FIG. 6 during the DRX phase. The baseband interface 707 may process the tasks as described above with respect to FIG. 4 for the receiving circuit 401.

The controlling circuit 705 is configured to check the scheduling of the CB message 611, 612, 613, 614, 621, 622, 623, 624, 631, 632, 633 reception and the scheduling of the idle mode task 609 for a conflict 629 and if a conflict 629 is detected to rearrange the scheduling of the idle mode task 609 and the scheduling of the CB message 611, 612, 613, 614, 621, 622, 623, 624, 631, 632, 633 reception in order to solve the conflict 629, e.g. as described above with respect to FIGS. 2, 3 and 4. The controlling circuit 705 may process the tasks as described above with respect to FIG. 4 for the controlling circuit 403.

EXAMPLES

The following examples pertain to further embodiments. Example 1 is a method for solving conflicts in scheduling cell broadcast (CB) message reception and idle mode tasks of a mobile device, the method comprising: receiving first information indicating a scheduling of a cell broadcast (CB) message during a discontinuous reception (DRX) phase of the mobile device; receiving second information indicating a scheduling of an idle mode task reception during the DRX phase; detecting if a conflict exists in the scheduling of the CB message reception and the scheduling of the idle mode task based on the first and second information; and if a conflict is detected: rearranging the scheduling of the idle mode task and the scheduling of the CB message reception to solve the conflict.

In Example 2, the subject matter of Example 1 can optionally include that the DRX phase comprises a plurality of DRX cycles and the detecting step is performed on a DRX cycle basis.

In Example 3, the subject matter of Example 2 can optionally include that the rearranging of the scheduling of the idle mode task comprises scheduling all activities related to the idle mode task to be performed within one part of the DRX cycle.

In Example 4, the subject matter of Example 3 can optionally include that the rearranging of the scheduling of the CB message reception further comprises opening a CB message reception window for a continuous reception of the CB message.

In Example 5, the subject matter of Example 4 can optionally include placing the CB message reception window within the remaining part of the DRX cycle.

In Example 6, the subject matter of any one of Examples 4-5 can optionally include that the CB message reception window fills the remaining part of the DRX cycle.

In Example 7, the subject matter of any one of Examples 2-6 can optionally include that the cell broadcast (CB) message comprises a plurality of instances having same information content.

In Example 8, the subject matter of Example 7 can optionally include that the plurality of instances of the CB message are arranged in a predetermined configuration.

In Example 9, the subject matter of any one of Examples 7-8 can optionally include that a CB repetition cycle indicating a cycle between at least two succeeding instances of the plurality of instances of the CB message is predetermined.

In Example 10, the subject matter of Example 9 can optionally include that a CB repetition cycle is independent of a DRX cycle.

In Example 11, the subject matter of any one of Examples 9-10 can optionally include that a beginning of a CB repetition cycle is independent of a beginning of a DRX cycle.

In Example 12, the subject matter of any one of Examples 9-11 can optionally include that a conflict is detected if a time interval in which no idle mode task is scheduled is less than a predetermined time interval.

In Example 13, the subject matter of Example 12 can optionally include that the predetermined time interval corresponds to the CB repetition cycle.

In Example 14, the subject matter of any one of Examples 1-13 can optionally include that the idle mode task comprises a paging indicator reception and a mobility measurement task.

In Example 15, the subject matter of Example 14 can optionally include that the mobility measurement task comprises at least one of an inter-frequency measurement and an inter Radio Access Technology (RAT) measurement.

In Example 16, the subject matter of any one of Examples 1-15 can optionally include that at least one of the first information indicating the scheduling of the CB message reception and the second information indicating the scheduling of the idle mode task is received by paging information comprised in a broadcast control channel (BCCH).

In Example 17, the subject matter of Example 16 can optionally include that at least one of the first information indicating the scheduling of the CB message and the second information indicating the scheduling of the idle mode task is received by retrieving information comprised in a system information block (SIB) of the BCCH.

Example 18 is a device for solving conflicts in scheduling cell broadcast (CB) message reception and idle mode tasks of a mobile device, the device comprising: a receiver, configured to: receive first information indicating a scheduling of a cell broadcast (CB) message reception during a discontinuous reception (DRX) phase of the mobile device; and receive second information indicating a scheduling of an idle mode task during the DRX phase; and a controller, configured to detect if a conflict exists in the scheduling of the CB message reception and the scheduling of the idle mode task based on the first and second information; and if a conflict is detected, rearrange the scheduling of the idle mode task and the scheduling of the CB message reception to solve the conflict.

In Example 19, the subject matter of Example 18 can optionally include that the DRX phase comprises a plurality of DRX cycles and the controller is configured to perform the detecting on a DRX cycle basis.

In Example 20, the subject matter of Example 19 can optionally include that the controller is configured to schedule all activities related to the idle mode task to be performed within one part of the DRX cycle if a conflict is detected.

In Example 21, the subject matter of Example 20 can optionally include that the controller is configured to open a CB message reception window for a continuous reception of the CB message if a conflict is detected.

In Example 22, the subject matter of Example 21 can optionally include that the controller is configured to place the CB message reception window within the remaining part of the DRX cycle.

Example 23 is an integrated circuit, comprising: a receiving circuit, configured to receive first information indicating a scheduling of a cell broadcast (CB) message reception and second information indicating a scheduling of an idle mode task; and a controlling circuit, configured to detect if a conflict exists in the scheduling of the CB message reception and the scheduling of the idle mode task based on the first and second information and if a conflict is detected to rearrange the scheduling of the idle mode task and the scheduling of the CB message reception to solve the conflict.

In Example 24, the subject matter of Example 23 can optionally include that the controlling circuit is configured to detect a conflict if a time interval in which no idle mode task is scheduled is less than a predetermined time interval.

In Example 25, the subject matter of any one of Examples 23-24 can optionally include that the idle mode task comprises a paging indictor reception and a mobility measurement task.

Example 26 is a computer readable non-transitory medium on which computer instructions are stored which when executed by a computer, cause the computer to perform the method of one of Examples 1 to 17.

Example 27 is a device for solving conflicts in scheduling cell broadcast (CB) message reception and idle mode tasks of a mobile device, the device comprising: means for receiving first information indicating a scheduling of a cell broadcast (CB) message reception during a discontinuous reception (DRX) phase of the mobile device; means for receiving second information indicating a scheduling of an idle mode task during the DRX phase; means for detecting if a conflict exists in the scheduling of the CB message reception and the scheduling of the idle mode task based on the first and second information; and if a conflict is detected, means for rearranging the scheduling of the idle mode task and the scheduling of the CB message reception to solve the conflict.

In Example 28, the subject matter of Example 27 can optionally include that the DRX phase comprises a plurality of DRX cycles and the means for detecting is configured to perform the detecting on a DRX cycle basis.

In Example 29, the subject matter of Example 28 can optionally include that the means for rearranging the scheduling of the idle mode task comprises means for scheduling all activities related to the idle mode task to be performed within one part of the DRX cycle.

In Example 30, the subject matter of Example 29 can optionally include that the means for rearranging of the scheduling of the CB message reception further comprises means for opening a CB message reception window for a continuous reception of the CB message.

In Example 31, the subject matter of Example 30 can optionally include means for placing the CB message reception window within the remaining part of the DRX cycle.

Example 32 is a system for solving conflicts in scheduling cell broadcast (CB) message reception and idle mode tasks of a mobile device, the system comprising: a receiving subsystem, configured to: receive first information indicating a scheduling of a cell broadcast (CB) message reception during a discontinuous reception (DRX) phase of the mobile device; and receive second information indicating a scheduling of an idle mode task during the DRX phase; and a controller subsystem, configured to detect if a conflict exists in the scheduling of the CB message reception and the scheduling of the idle mode task based on the first and second information; and if a conflict is detected, rearrange the scheduling of the idle mode task and the scheduling of the CB message reception to solve the conflict.

In Example 33, the subject matter of Example 32 can optionally include that the DRX phase comprises a plurality of DRX cycles and the controller subsystem is configured to perform the detecting on a DRX cycle basis.

In Example 34, the subject matter of Example 33 can optionally include that the controller subsystem is configured to schedule all activities related to the idle mode task to be performed within one part of the DRX cycle if a conflict is detected.

In Example 35, the subject matter of Example 34 can optionally include that the controller subsystem is configured to open a CB message reception window for a continuous reception of the CB message if a conflict is detected.

In Example 36, the subject matter of Example 35 can optionally include that the controller subsystem is configured to place the CB message reception window within the remaining part of the DRX cycle.

In Example 37, the subject matter of any one of Examples 32-36 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for solving conflicts in scheduling cell broadcast (CB) message reception and idle mode tasks of a mobile device, the method comprising:
   receiving first information indicating a scheduling of a cell broadcast (CB) message reception during a discontinuous reception (DRX) phase of the mobile device;
   receiving second information indicating a scheduling of an idle mode task during the DRX phase;
   detecting if a conflict exists in the scheduling of the CB message reception and the scheduling of the idle mode task based on the first and second information; and
   if a conflict is detected, providing a CB message reception window for a continuous reception of the CB message to rearrange the scheduling of the idle mode task and the scheduling of the CB message reception to solve the conflict, wherein the CB message reception window has a window size determined based on a duration of the idle mode task and a length of a DRX cycle of the DRX phase.

2. The method of claim 1, wherein the DRX phase comprises a plurality of DRX cycles and the detecting step is performed on a DRX cycle basis.

3. The method of claim 2, wherein the rearranging of the scheduling of the idle mode task comprises scheduling all activities related to the idle mode task to be performed within one part of the DRX cycle.

4. The method of claim 2, wherein the cell broadcast (CB) message comprises a plurality of instances having same information content.

5. The method of claim 4, wherein the plurality of instances of the CB message are arranged in a predetermined configuration.

6. The method of claim 4, wherein a CB repetition cycle indicating a cycle between at least two succeeding instances of the plurality of instances of the CB message is predetermined.

7. The method of claim 6, wherein a CB repetition cycle is independent of the DRX cycle.

8. The method of claim 6, wherein a beginning of a CB repetition cycle is independent of a beginning of the DRX cycle.

9. The method of claim 6, wherein a conflict is detected if a time interval in which no idle mode task is scheduled is less than a predetermined time interval.

10. The method of claim 9, wherein the predetermined time interval corresponds to the CB repetition cycle.

11. The method of claim 1, comprising:
    placing the CB message reception window within the remaining part of the DRX cycle.

12. The method of claim 1, wherein the CB message reception window fills the remaining part of the DRX cycle.

13. The method of claim 1, wherein the idle mode task comprises a paging indictor reception and a mobility measurement task.

14. The method of claim 13, wherein the mobility measurement task comprises at least one of an inter-frequency measurement and an inter Radio Access Technology (RAT) measurement.

15. The method of claim 1, wherein at least one of the first information indicating the scheduling of the CB message reception and the second information indicating the scheduling of the idle mode task is received by paging information comprised in a broadcast control channel (BCCH).

16. The method of claim 15, wherein at least one of the first information indicating the scheduling of the CB message and the second information indicating the scheduling of the idle mode task is received by retrieving information comprised in a system information block (SIB) of the BCCH.

17. The method of claim 1, wherein the window size is dynamically determined per DRX cycle based on the duration of the idle mode task and the length of the respective DRX cycle.

18. The method of claim 1, wherein the idle mode task is scheduled in a first portion of the DRX cycle and the CB message reception window is provided in a second portion of the DRX cycle following the first portion.

19. A device for solving conflicts in scheduling cell broadcast (CB) message reception and idle mode tasks of a mobile device, the device comprising:
    a receiver, configured to:
    receive first information indicating a scheduling of a cell broadcast (CB) message reception during a discontinuous reception (DRX) phase of the mobile device; and
    receive second information indicating a scheduling of an idle mode task during the DRX phase; and
    a controller, configured to:
    detect if a conflict exists in the scheduling of the CB message reception and the scheduling of the idle mode task based on the first and second information; and
    if a conflict is detected, provide a CB message reception window for a continuous reception of the CB message to rearrange the scheduling of the idle mode task and the scheduling of the CB message reception to solve the conflict, wherein the CB message reception window has a window size determined based on a duration of the idle mode task and a length of a DRX cycle of the DRX phase.

20. The device of claim 19, wherein the DRX phase comprises a plurality of DRX cycles and the controller is configured to perform the detecting on a DRX cycle basis.

21. The device of claim 20, wherein the controller is configured to schedule all activities related to the idle mode task to be performed within one part of the DRX cycle if a conflict is detected.

22. The device of claim 19, wherein the controller is configured to place the CB message reception window within the remaining part of the DRX cycle.

23. An integrated circuit, comprising:
    a receiving circuit, configured to receive first information indicating a scheduling of a cell broadcast (CB) message reception and second information indicating a scheduling of an idle mode task; and
    a controlling circuit, configured to detect if a conflict exists in the scheduling of the CB message reception and the scheduling of the idle mode task based on the first and second information and, if a conflict is detected, provide a CB message reception window for a continuous reception of the CB message to rearrange the scheduling of the idle mode task and the scheduling of the CB message reception to solve the conflict, wherein the CB message reception window has a window size determined based on a duration of the idle mode task and a length of a DRX cycle of the DRX phase.

24. The integrated circuit of claim 23, wherein the controlling circuit is configured to detect a conflict if a time interval in which no idle mode task is scheduled is less than a predetermined time interval.

25. The integrated circuit of claim 23, wherein the idle mode task comprises a paging indictor reception and a mobility measurement task.

* * * * *